United States Patent [19]

Morse, Jr.

[11] 4,005,756
[45] Feb. 1, 1977

[54] LIGHTWEIGHT PASTURE HARROW

[76] Inventor: William E. Morse, Jr., 612 A Bankers Trust Bldg., Jackson, Miss. 39201

[22] Filed: Aug. 5, 1975

[21] Appl. No.: 602,063

Related U.S. Application Data

[63] Continuation-in-part of Ser. No. 388,495, April 15, 1973, abandoned.

[52] U.S. Cl. .............................. 172/643; 56/400.16; 172/142; 172/198; 172/389; 172/657; 172/697; 172/753
[51] Int. Cl.² .................................... A01B 19/02
[58] Field of Search ............ 172/29, 142, 152, 189, 172/193, 194, 195, 197, 198, 199, 200, 389, 390, 612, 620, 621, 643, 657, 658, 681, 691, 697, 705, 706, 707, 708, 709, 710, 711, 714, 719, 747, 753, 762, 765, 766, 769, 770, 771, 776; 56/400, 400.16; 47/31; 71/21

[56] References Cited

UNITED STATES PATENTS

| 264,546 | 9/1882 | Matteson | 172/687 |
|---|---|---|---|
| 429,955 | 6/1890 | Rand | 172/697 X |
| 524,260 | 8/1894 | Merridith | 172/620 |
| 556,225 | 3/1896 | Vaughn | 172/142 |
| 572,935 | 12/1896 | Topping | 172/691 X |
| 886,406 | 5/1908 | Rarig | 56/400 |
| 898,695 | 9/1908 | Sosa | 172/612 |
| 926,902 | 7/1909 | Smith | 56/400 |
| 1,008,382 | 11/1911 | Sourek | 47/1 UX |
| 1,082,430 | 12/1913 | Mallory | 172/200 |
| 1,126,813 | 2/1915 | Macphail | 56/400 |
| 1,160,282 | 11/1915 | Harris et al. | 56/400.05 |
| 1,384,220 | 7/1921 | Sykes | 172/612 X |
| 1,571,974 | 2/1926 | Simons et al. | 172/389 |
| 1,575,630 | 3/1926 | Kinney | 172/197 X |
| 1,840,899 | 1/1932 | Hall | 172/703 |
| 2,132,568 | 10/1938 | Jacobs | 47/31 |
| 2,737,004 | 3/1956 | Archer | 172/691 |
| 2,741,966 | 4/1956 | Slocum | 172/152 X |
| 2,920,405 | 1/1960 | Cole | 172/142 |
| 3,045,414 | 7/1962 | Scheidenhelm | 56/400 X |
| 3,356,162 | 12/1967 | vanderLely | 172/643 |

FOREIGN PATENTS OR APPLICATIONS

| 1,228,885 | 9/1960 | France | 172/707 |
|---|---|---|---|
| 124,776 | 6/1900 | Germany | 56/400 |
| 1,140,388 | 11/1962 | Germany | 172/142 |
| 91,334 | 3/1958 | Norway | 172/658 |
| 4,227 | 11/1892 | Sweden | 172/643 |

Primary Examiner—Richard T. Stouffer

[57] ABSTRACT

A lightweight pasture harrow for breaking up and scattering piles of manure and like material in a pasture including a shaped wire mesh framework secured to a front crossbar which provides a tow bar for pulling the harrow across a field, or pasture. The wire mesh framework includes a plurality of longitudinal wires and a plurality of transverse wires. Ends of the longitudinal wires may serve as harrow teeth, or separate harrow teeth may be provided.

36 Claims, 23 Drawing Figures

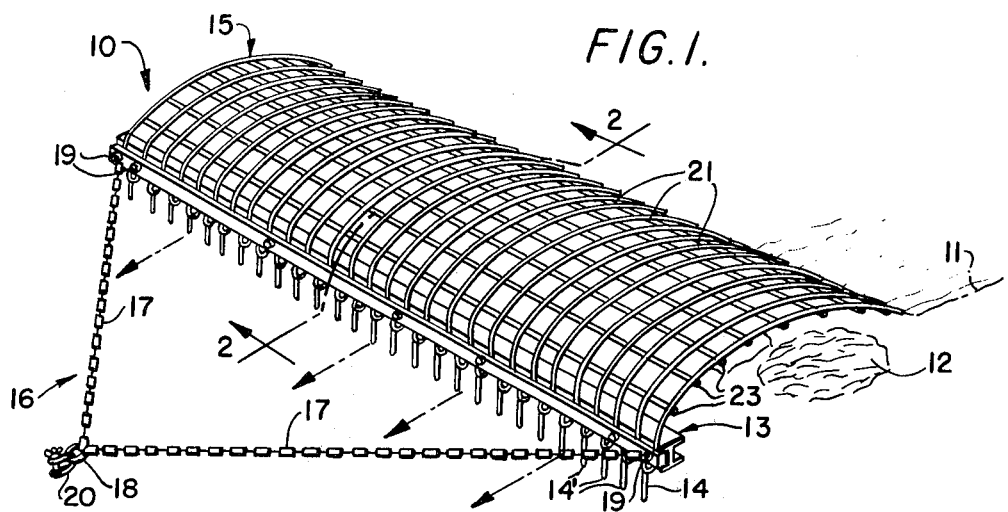
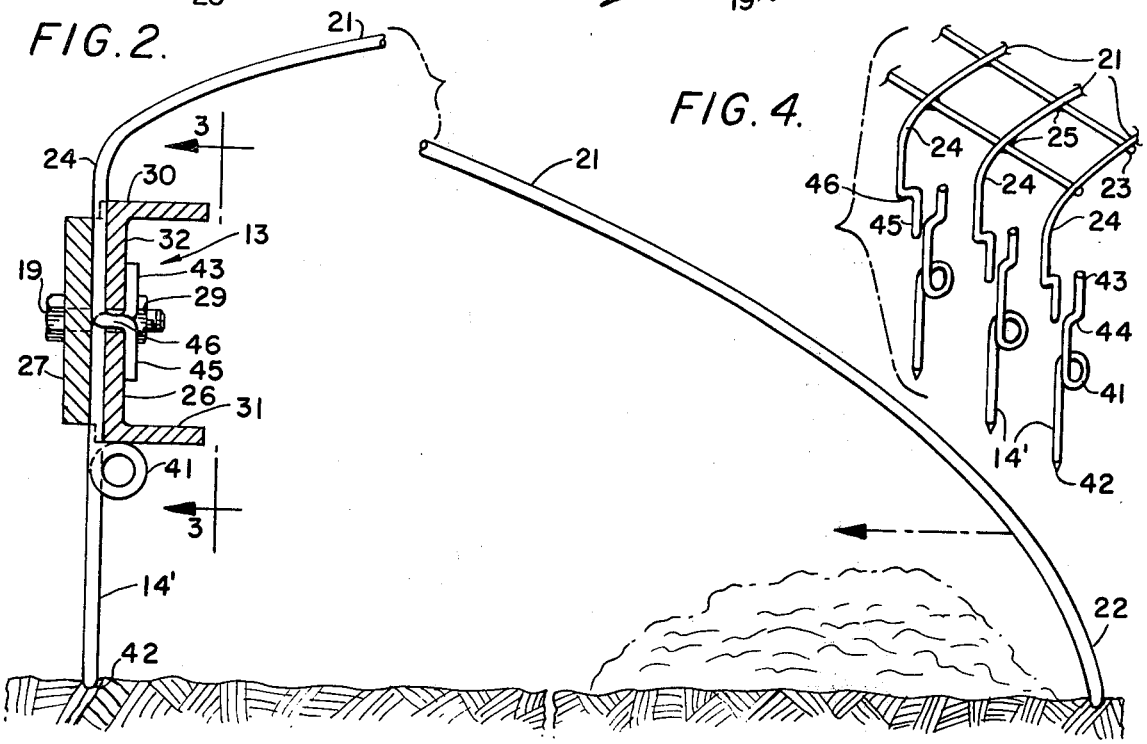
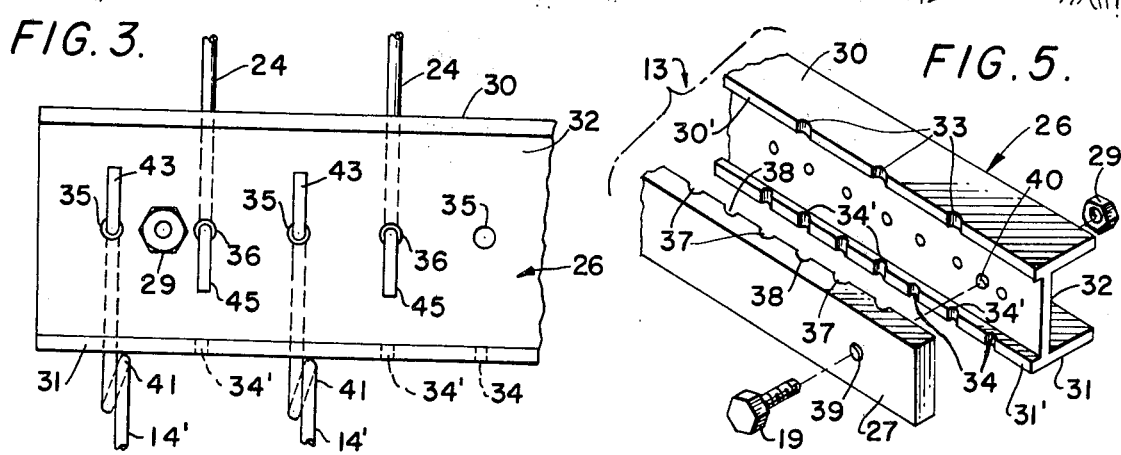

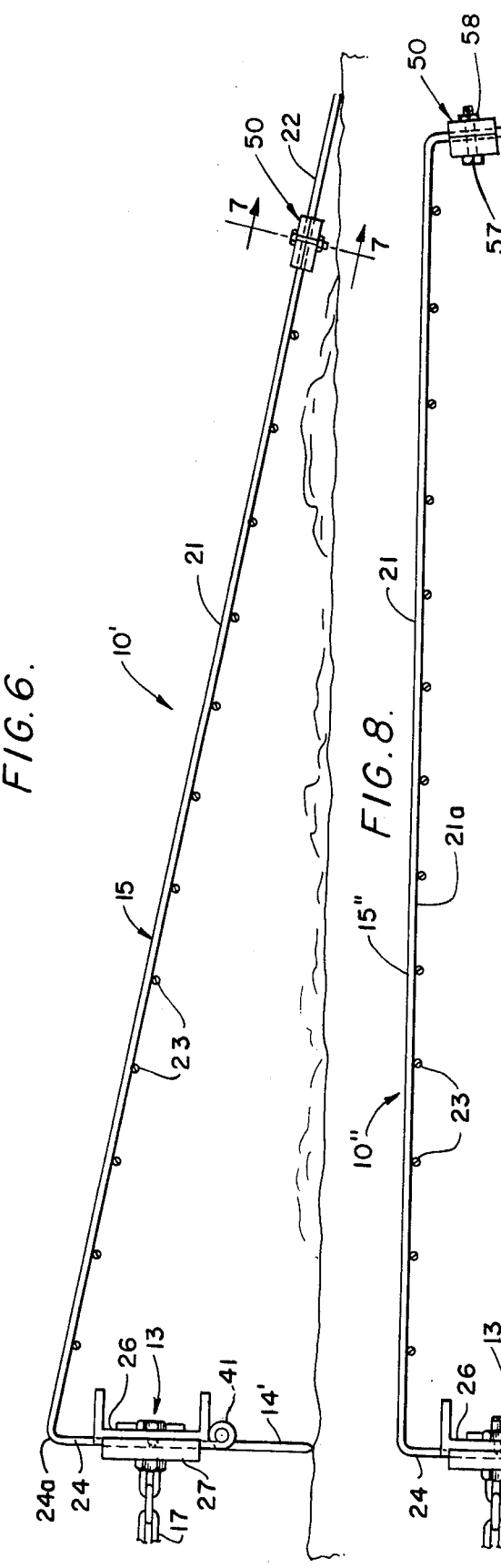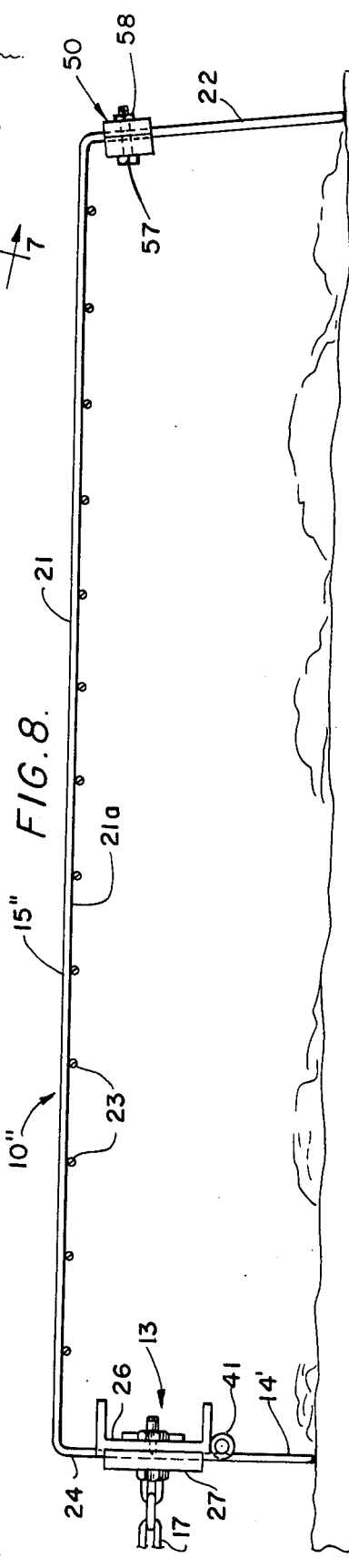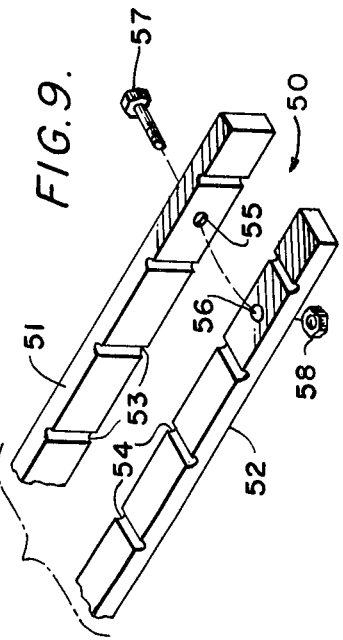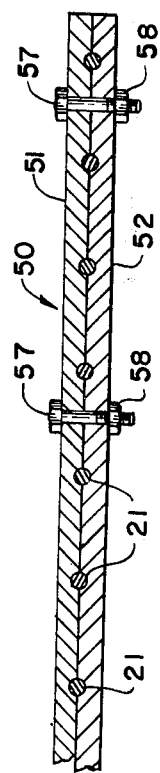

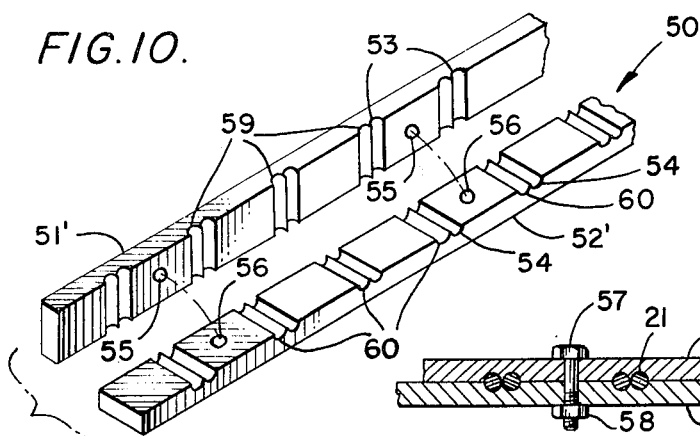
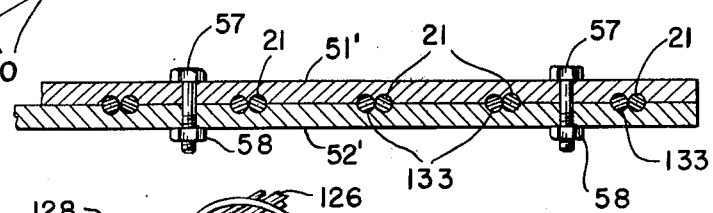
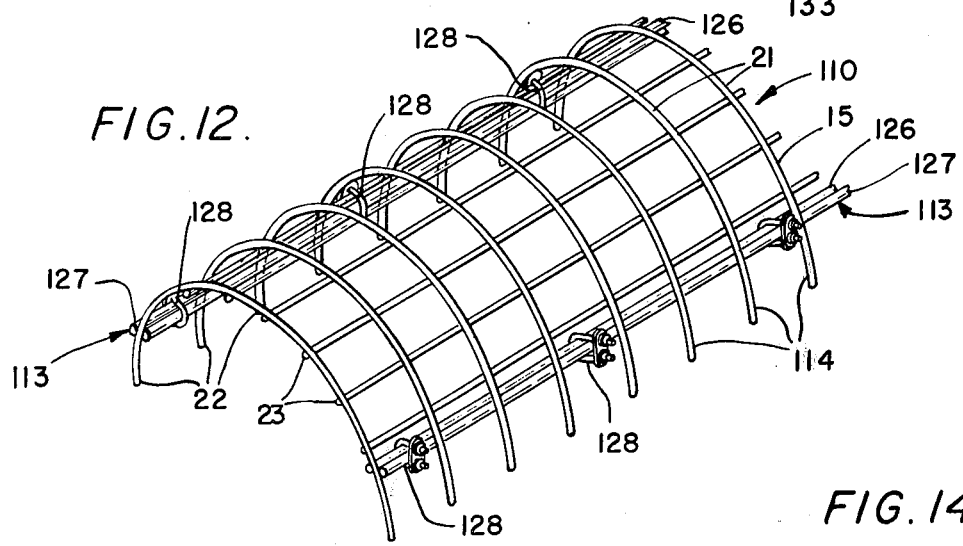
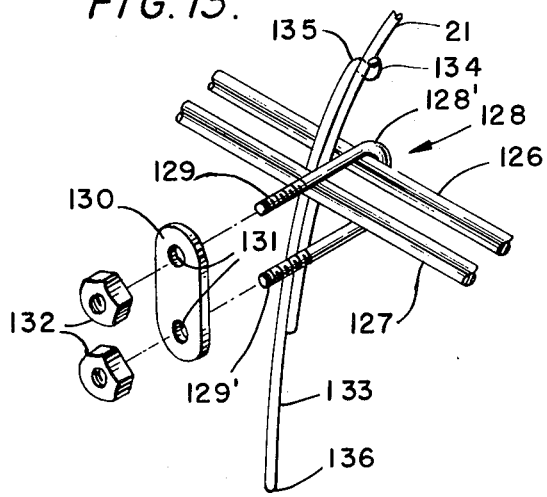
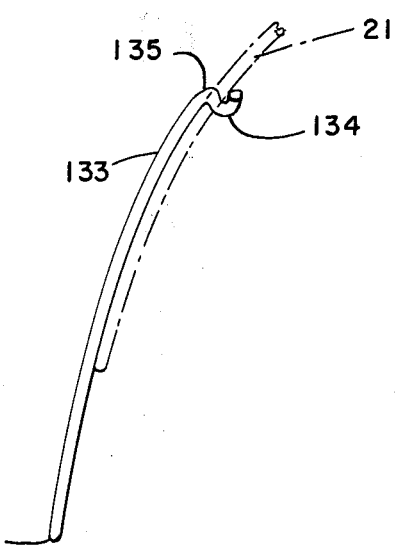

LIGHTWEIGHT PASTURE HARROW

RELATED APPLICATION

This is a continuation-in-part of U.S. patent application Ser. No. 388,495 filed Apr. 15, 1973, abandoned, in the name of William E. Morse, Jr. and entitled Lightweight Pasture Harrow.

BRIEF DESCRIPTION AND OBJECTS OF THE INVENTION

This invention relates to an improved lightweight pasture harrow. More particularly the invention relates to a light weight pasture harrow adapted to be pulled over the ground for breaking up piles of manure and the like in a pasture, comprising a rigid elongated front crossbar, a row of transversely spaced front harrow teeth depending from said crossbar, a wire mesh framework secured to said front crossbar along the length thereof and extending rearwardly from said front crossbar, said wire mesh framework including a plurality of transversely spaced longitudinal wire members with trailing ends for engaging the ground and providing a row of transversely spaced rear harrow teeth, and a plurality of longitudinally spaced transverse wire members intersecting said longitudinal wire members with means securing said longitudinal and transverse wire members together where they intersect, said wire mesh framework normally maintaining a predetermined shape, and being resilient to yield to objects encountered in normal usage and to return to its predetermined shape upon disengagement with the encountered objects.

It is a primary object of this invention to provide a lightweight harrow for use in breaking up and scattering manure piles dropped by animals in a pasture without causing damage to the grass, or other desirable vegetation in the pasture. In fields where cattle are pastured piles of manure which are deposited by animals kill or damage the underlying grass. These piles which each covers approximately 1½ square feet in area cause a loss to the cattleman of good grazing land for at least 2 years. A single cow will drop manure about three to four times per day resulting in a like number of manure piles per day per cow which if now removed will kill or damage the grass in an area of the pasture equal to the number of piles dropped per day per cow multiplies by 1½ square feet. However, if the manure piles are broken up and scattered, the manure will not kill the grass but instead will add fertility to the area resulting in more abundant growth of the grass.

To accomplish the above stated primary object, the invention provides a harrow having a lightweight framework formed of wire mesh similar to the reinforcing wire used in concrete construction. The wire mesh framework is secured to a rigid front crossbar which serves as a tow-bar by which the harrow is pulled by a tractor or other draft means across a pasture. The wire mesh framework may be formed into a number of different shapes, such as arcuate, flat, or angularly sloping rearwardly from the front crossbar. The wire mesh framework has sufficient rigidity to normally maintain a predetermined shape, but it will resiliently flex as it is pulled across a field to allow the harrow to ride over and automatically dump trash, sticks, grass cuttings, stalks, etc., before sufficient build up of trash collects to make the harrow teeth ineffective for their primary purpose of breaking up and scattering manure piles.

It is a further object of this invention to provide a harrow having a rectangular wire mesh framework composed of a plurality of longitudinal wires and a plurality of transverse wires rigidly secured to the longitudinal wires at their points of intersection.

It is a further object of this invention to provide a harrow with a rectangular wire mesh framework as above described wherein at least some of the ends of the longitudinal wires of the wire mesh framework function as harrow teeth. In one embodiment of the invention the trailing ends of the longitudinal wires provide a set of rear harrow teeth and the front ends of the longitudinal wires provide a set of front harrow teeth. In another embodiment of the invention the front ends of the longitudinal wires are clamped to the front crossbar in a vertically depending arrangement.

It is a further object of the invention to provide a lightweight harrow having a front and rear set of closely spaced teeth connected by a wire mesh framework of predetermined shape and flexibility for providing a vertical and horizontal spring action for effectively breaking up and spreading manure piles and dirt clods.

It is another object of this invention to provide a lightweight harrow which does not dig into or tear up pasture sod and which permits the user to load it on a carrying vehicle without lifting more than one-half the design weight. A suitable design weight of the harrow for use in breaking up and scattering manure piles has been found to be within the range of 25 to 55 pounds. For other uses, other design weights may be satisfactory. For example, the pasture harrow may be produced in a heavier form for use in cultivation of farmland, or fields.

While the harrow frame has been described as being a wire mesh framework, it is not intended that the invention be limited to the use of commercially available wire mesh but also includes the use of framework fabricated at the site of manufacture from wires or rods of a gauge selected according to intended use.

BRIEF DESCRIPTION OF THE DRAWINGS

With the foregoing objects and features in view and such other objects and features which may become apparent as the specification proceeds, the invention will be understood from the following description taken in conjunction with the accompanying drawings, wherein like characters of reference designate like parts and wherein:

FIG. 1 is a perspective view of one embodiment of the invention;

FIG. 2 is a vertical cross sectional view of the invention taken on line 2—2 of FIG. 1 with an intermediate portion of the wire mesh frame broken away;

FIG. 3 is a fragmentary rear elevational view of the front crossbar of the invention taken from line 3—3 of FIG. 2;

FIG. 4 is an exploded fragmentary view of the front portion of the harrow shown in FIG. 1 with the crossbar removed;

FIG. 5 is an exploded fragmentary view of the front crossbar of the invention;

FIG. 6 is a side elevational view of a modified form of the invention;

FIG. 7 is a cross sectional view taken on line 7—7 of FIG. 6;

FIG. 8 is a side elevational view of another modified form of the invention;

FIG. 9 is an exploded fragmentary view of the rear reinforcing bar illustrated in FIG. 7.

FIG. 10 is a perspective view of a modified form of cross bar comprising a pair of cooperating members for use instead of the bars illustrated in FIGS. 7 and 9;

FIG. 11 is a cross sectional view like in FIG. 7 of the modified crossbar illustrated in FIG. 10, with longitudinal wires and replaceable teeth clamped between the cooperating crossbar members;

FIG. 12 is a perspective view of another embodiment of the invention;

FIG. 13 is an enlarged and exploded fragmentary perspective view of a portion of the harrow illustrated in FIG. 12 with a replaceable harrow tooth clamped in position;

FIG. 14 is a perspective view of the replaceable harrow tooth illustrated in FIG. 13.

DETAILED DESCRIPTION

Figure 21:
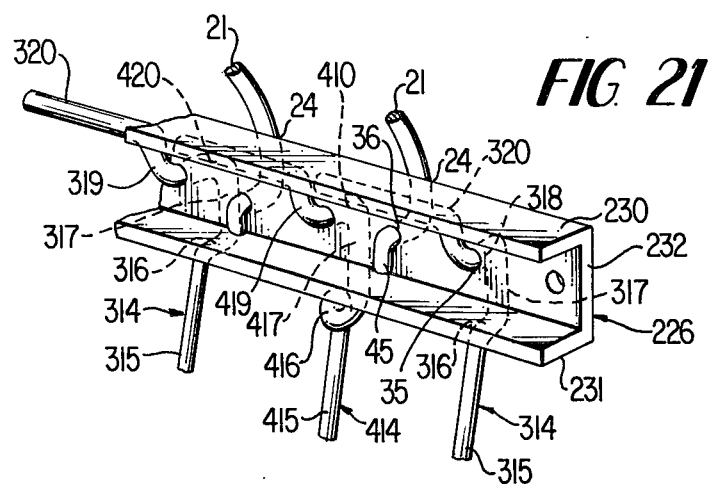
FIG. 21 is a fragmentary perspective view taken from behind the front crossbar of still a further modification of the harrow shown in FIG. 1, with the front clamping bar omitted.

Referring now to FIGS. 1-5, and particularly to FIG. 1, one embodiment of the lightweight pasture harrow of this invention is illustrated and is designated by the reference numeral 10, in position to be pulled across the surface 11 of a pasture in the direction of the arrows in order to break up and scatter piles of manure 12 or other piles of material. The harrow 10 includes a rigid elongated front crossbar 13, a row 14 of transversely spaced front harrow teeth 14' depending vertically from the crossbar 13, a stiff resilient wire mesh framework 15 secured to the front crossbar 13 along the length of the crossbar and extending rearwardly from the crossbar, and a draft harness 16. The draft harness 16 comprises a pair of chains 17 each having one of their ends connected to a ring 18 and their other ends connected to opposite ends of the crossbar 13 by bolts 19, and a clevis 20 secured to the ring 18 for connecting the harness to a tractor or other means for pulling the harrow.

The wire mesh framework 15 includes a plurality of transversely spaced longitudinal wire members 21 with trailing ends 22 engaging the ground and providing a row of transversely spaced rear teeth, and longitudinally spaced transverse wire members 23 intersecting and secured to the longitudinal wire members at their points of intersection by spot welds 25 or other rigid securing means. The forward end portions 24 of the longitudinal wire members 21 project vertically downwardly and are secured to the crossbar 13. The wire mesh framework 15 may suitably be made from steel reinforcing wire mesh such as used in concrete construction. It must be of sufficient rigidity to normally maintain a predetermined shape, such as the arch illustrated in FIG. 1 and it is sufficiently resilient to yield within limits as a result of external forces encountered in normal usage and to return to its predetermined shape upon the removal of said normally encountered forces. The resiliency of the wire mesh framework 15 will aid in the breaking up and scattering of the manure piles 12 because the wire members 21 will vibrate and tend to throw off any manure of dirt that clings to the wire teeth 22. For purpose of illustration only, suitable spacing between the longitudinal wire members has been found to be within the approximate range from 1 to 4 inches and the spacing between the transverse wire members has been found to be within the approximate range from 6 to 12 inches.

The front crossbar 13 includes a back member 26 and a front member 27 clamped to the back member 26 by threaded bolts 19 extending through apertures 39 and 40 in the front and back members 27 and 26 and secured therein by nuts 29.

The back member 26 is a flanged metal beam having parallel top and bottom flanges 30, 31 integrally connected by a vertical web 32. The top flange 30 has a front edge 30' projecting forwardly of the web 32 and a set of semi-circular vertical slots 33 are formed in the top flange along the front edge at transversely spaced intervals with the slots opening forwardly. The bottom flange 31 likewise has a front edge 31' projecting forwardly of web 32 and a set of semi-circular vertical slots 34 formed therein at transversely spaced intervals with the slots opening forwardly. The slots in the top flange are offset transversely from the slots in the bottom flange by one-half the distance between a pair of adjacent slots in the bottom flange so that the longitudinal axis of each upper slot if extended downwardly would intersect a line drawn between the axis of a pair of bottom slots at approximately its mid point. For the set of bottom slots 34 there is a corresponding set of holes 35 drilled perpendicularly through the web 32 along a longitudinal center line thereof. The axis of each of the holes 35 if extended forwardly would intersect the vertical axis extended upwardly of a corresponding one of the slots 34. Similarly for the top slots 33 there is a corresponding set of holes 36 drilled perpendicularly through the web 32 along the same line as the line on which the holes 35 are drilled, with each of the holes 36 being midway between a pair of the holes 35. The axis of each of the holes 36 if extended forwardly would intersect the vertical axis extended downwardly of a corresponding one of the slots 33.

The front member 27 is an elongated strip of flat bar stock having a width of slightly less than the distance between the top and bottom flanges 30 and 31. The rear face of the member 27 is provided with two sets of rearwardly semi-circular vertical slots, across the width thereof. One set of slots 37 in member 27 is lined up opposite the slots 33 in the rear member while the other set of slots 38 is lined up opposite the slots 34 in the rear member when the front and back members 27 and 26 are assembled.

Each of the front teeth 14' as shown in FIG. 4 is formed from cylindrical metal rod stock preferably of steel and of the same diameter as the longitudinal wire members 21 of the wire mesh frame 15. Each tooth 14' preferably includes a spring loop 41 formed intermediate a pointed bottom end 42 and an offset vertical end 43. The offset end 43 is connected with the remainder of the tooth 14' by a right angle bend extending in the same direction as the loop 41. The purpose of the loop 41 is to give the tooth resiliency in a vertical plane extending longitudinally through the harrow and the loop.

The method of assembling the teeth will be apparent by looking at FIGS. 2 and 3. The teeth are mounted relative to the back member 26 by inserting the offset portion 43 of each tooth through one of the holes 35 and then swinging the tooth 14' downwardly until it is in a vertical position against the front face of the web 32, and the offset portion 43 is in a vertical position against the rear face of the back member with the right angle bend 44 extending longitudinally through a hole 35. When so positioned the portion of the tooth immediately above the loop 41 will lie within one of the semi-circular slots 34 in the front edge of the bottom flange 31 and the tooth will be held against lateral displacement by the right angle bend 44 in the hole 35.

The front end portions 24 of each of the longitudinal wire members 21 are provided with downwardly extending offset ends 45 integrally connected by a right angle bend 46. Each end portion 24 is mounted in the back member 26 by inserting the offset portion 45 through one of the holes 36 and swinging the end portion 24 upwardly until it abuts against the front face of the back member 26 and the offset portion 45 extends vertically downward against the rear face of the back member with the right angle bend 46 extending through the hole 36. When so positioned the end portion 24 will lie within one of the vertical slots 33 and will be held against transverse lateral displacement by the side walls of the slot and against rotative displacement by the right angle bend 46 within the hole 36.

When the teeth 14' and the front end portions 24 of the wire members 21 have been assembled in the back member 26 in the manner described above, the front member 27 with slots 37 and 38 aligned with the end portions 24 and the teeth 14' respectively is clamped against the back member 26 and intervening end portions 24 and teeth 14' by inserting bolts 19 through the apertures 39, 40 and screwing the nuts 29 on the bolts until they are tight.

It is within the scope of this invention that the front teeth 14' may be made integral with the longitudinal wire members 21 by extending the end portions 24 vertically downwardly a distance corresponding to the desired height of the teeth 14' and omitting the offset portions 43 and 45 along with the right angled bends 44 and 46. When this is done, end portions 24 and teeth 14' will be vertically positioned by slots 33 in the top flange 30 and a corresponding vertically aligned set of slots 34' in the bottom flange 31. The spring loop 41 may or may not be included as desired, but it is preferred to include the spring loop. The end portions 24 and integral tooth extensions will be clamped against the front face of the back member 26 by bolting the front member 27 to the back member as previously described, in which case only the vertical slots 37 opposing the slots 33 will be required. The harrow 10 may be originally made with the teeth 14' integral with the longitudinal wire member end portions 24, and the crossbar 13 may be provided with the required slots and holes to accomodate both the teeth 14' as integral extensions of the wire end portions 24 and the teeth 14' as separate replacement teeth.

A modified form 10' of the invention as illustrated in FIG. 6 is in most respects similar to the harrow 10 shown in FIGS. 1–5 except with respect to the shape of the wire frame. The wire frame 15 of the harrow 10' slopes downwardly and rearwardly in a straight line from a position above the crossbar 13 an determined by the position of the angular bend 24a.

Still another modified form 10" of the invention is shown in FIG. 8 and is like the harrow 10 except that each longitudinal wire member 21 of the wire frame 15" incudes a straight portion 21a extending at a right angle to the front end portion 24 and the trailing end portion 22 extends obliquely downward from straight portion 21a.

The harrow forms 10' and 10" illustrated in FIGS. 6 and 8 may optionally be provided with a rigid reinforcing member 50 secured transversely across the longitudinal wire members along the top of the rear harrow teeth portions 22. The reinforcing member 50 includes a pair of elongated bars 51 and 52 each provided with transversely spaced grooves extending across the full width of one face of the bar. The grooves 53 in the bar 51 oppose the grooves 54 in the bar 52 so that when the bars 51 and 52 are clamped together with the grooves facing each other the grooves provide cylindrical bores for receiving the longitudinal wires 21. The bars 51 and 52 are each provided with a set of apertures 55 and 56 respectively for receiving the shank of threaded bolts 57 by which the reinforcing bar 50 is clamped to the wires 21 when the nuts 58 are screwed onto the bolts 57 and tightened.

In the use of the invention the harrow is pulled across the surface of a pasture by means of the draft harness 16 connected to a suitable towing vehicle or other draft means. The front and rear teeth 14' and 22 will engage piles of manure or other material such as dirt clods and scatter the material over the ground. The harrow because of its lightweight construction afforded by the wire mesh frame 15 will avoid digging into the ground and thus will do little or no damage to the roots of grass growing in the pasture. Various shapes of the wire mesh frame may be selected as desired. If a greater angle of rake is desired the form illustrated in FIG. 8 may be selected. If a flat angle of rake is desired, the form illustrated in FIG. 6 may be selected. Various intermediate angles of rake may be formed as desired. Automatic dumping of trash of various kinds is afforded as a result of the shape and flexibility of the wire mesh frame.

FIGS. 10 and 11 show a modified form 50' of the reinforcing crossbar 50 shown in FIGS. 7 and 9. The modified crossbar 50' may be used in place of the reinforcing bar 50 on the harrows shown in FIG. 6 and 8 and may be used as a reinforcing bar across the rear teeth 22 of the harrow shown in FIG. 1. The crossbar 50' includes a pair of cooperating members 51' and 52' which are provided with opposed sets of equally spaced transverse grooves 53 and 54 respectively extending across their opposed faces for receiving the longitudinal wire frame members 21, and with parallel sets of opposed grooves 59 and 60 respectively adjacent the grooves 53 and 54 for receiving the shanks of replacement teeth and for clamping the replacement teeth along side of and parallel to the longitudinal wires 21. Apertures 55 and 56 are provided at spaced intervals along the length of members 51' and 52' respectively for receiving clamping bolts 57 and as shown in FIG. 11. The purpose of the modified crossbar 50' is to permit the addition of replacement teeth 133 in the event one or more of the ends 22 of a longitudinal wire 21 becomes broken, or excessively worn or damaged so that the end 22 is no longer suitable for a harrow tooth. One suitable form of replacement tooth for use with the crossbars 50' is illustrated in FIG. 14. The tooth 133 is formed of the same size wire as the longitudinal wire members 21 and is shaped longitudinally to conform to the shape of the original tooth it replaces. One end 136 of the tooth 133 is free to engage the ground while the other end 135 is provided with a U-shaped bend 134 extending laterally at about 90° from the longitudinal axis of the tooth 133 inorder to partially encircle one of the longitudinal wires 21 in the manner illustrated in FIG. 14. The U-bend is shaped to cause the bight of the U to fit snugly under the longitudinal wire 21 while the legs of the U will rise on opposite sides of the wire 21 to a point flush or slightly above it.

FIG. 12 illustrates a modified harrow 110 including an arched rectangular wire mesh frame 15 having transversely spaced longitudinal wires 21 and longitudinally spaced transverse wires 23 welded or otherwise rigidly connected at their points of intersection to the longitudinal wires. The rear ends of the longitudinal wires 21 provide ground engaging rear teeth 22 and the front ends of the wires 21 provide ground engaging front teeth 114. A pair of crossbars 113 are clamped transversely across the longitudinal wires 21 at front and rear ends of the harrow. The crossbars 113 are still another form of crossbars which may be used in lieu of the reinforcing crossbars 50 and 50' and in lieu of the crossbar 13 previously discussed. The crossbars 113 include a pair of rigid elongated bar members 126 and 127 which are placed on opposite sides of the longitudinal wires 21 and are clamped together by means of U-bolt clamps 128 spaced at intervals along the length of the crossbar. The U-bolt clamps include a U-bolt 128' having screw threaded opposite ends 129, 129', an elongated plate 130 having apertures 131 for receiving the ends of the U-bolt, and a pair of nuts 132 for threaded engagement with the ends of the U-bolt 128'.

Although not shown, the harrow 110 will be provided with a draft harness 16 secured to opposite ends of the front crossbar 113 in the same manner as illustrated in FIG. 1. Normally the harrow 110 will be manufactured and sold as illustrated in FIG. 12. If in use, the ends of the longitudinal wires 21 become broken, or uneven, through wear, the ends may be evened by cutting the wires to the same length and bending to the proper vertical position to form a new set of teeth. The longitudinal dimension of the wires 21 will be designed so that several new sets of teeth can be made in the manner described.

Instead of making new sets of teeth by evening and bending the longitudinal wires 21, replacement teeth 133 may be clamped in place as illustrated in FIGS. 13 and 14. The replacement teeth 133, previously described, are positioned along side of the ends of the longitudinal wires 21 with the lateral U-bend engaged under the wire 21. The crossbar members 126 and 127 are then drawn together by tightening the U-bolt clamps 128 until the teeth 133 and wires 21 are rigidly secured together. Although the crossbar members 126 and 127 are shown to be circular in cross section, they may have other cross sectional shapes including but not limited to square, rectangular and other polygonal shapes.

Figure 16:
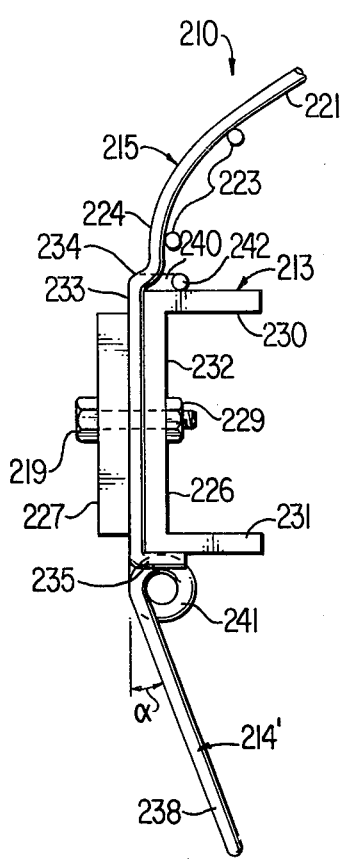
FIG. 16 is a fragmentary side elevational view of the front portion of another modification of the harrow shown in FIGS. 1-5.
Figure 17:
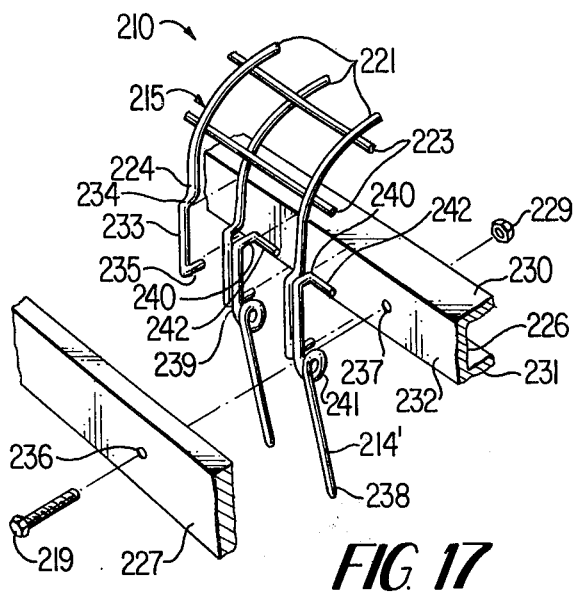
FIG. 17 is a fragmentary exploded perspective view of the modified harrow shown in FIG. 16.

FIGS. 16 and 17 show still another modification 210 of the harrow 10 illustrated in FIG. 1 including only modifications to the front portion of the harrow 10 including the front crossbar 13, the set of teeth 14 and the forward end portions 24 of the longitudinal wires 21. The crossbar 213 of the modified harrow 210 includes a back member 226 which is a standard channel bar having a central web 232 and top and bottom flanges 230 and 231 respectively, and a front clamping member 227 of flat bar stock. The front and back members 227 and 226 of the crossbar 213 do not have the vertical slots which are provided in the front and back members 26 and 27 of the harrow 10 and thus the cost of manufacture of the crossbar 213 can be reduced compared to the cost of manufacture of the crossbar 13. The harrow 210 includes a wire mesh framework 215 having transversely spaced longitudinal wire members 221 and longitudinally spaced transverse wire members 223 which is like the wire mesh framework 15 of the harrow 10 except for the front end portions 224 of the longitudinal wire members 221. The front end portions 224 are each bent to include a forward offset portion 233 joined to the remainder of the longitudinal wire member 221 by an upper approximately right angle connecting portion 234, and a bottom right angle rearward extension 235. The upper right angle connecting portion 234, the offset portion 233 and the bottom right angle rearward extension 235 form a channel shaped bend which fits snugly against the outside surfaces of the channel-shaped back member 226.

Figure 18:
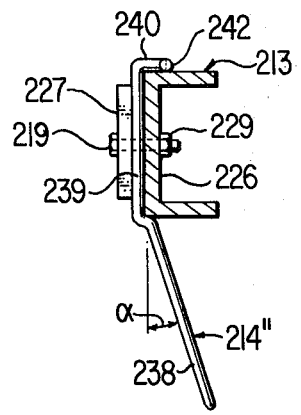
FIG. 18 is a cross sectional view of the front crossbar shown in FIG. 16 with a modified front harrow tooth.

The removable teeth 214' which are substituted for the teeth 14' of harrow 10 each include a rearwardly inclined ground engaging lower portion 238, a single coil loop 241, a straight vertical upper portion 239 connected to the lower portion by the loop 241, a right angle upper rearward extension 240, and a transverse terminal upper extension which is normal to the upper rearward extension. The upper rearward extension 240 and the transverse terminal extension 242 are adapted to overlie the upper flange 230 of the channel-shaped rear member 226 when the upper portion 239 is pressed vertically against the web 232 of the rear member, and the loop 241 will fit snugly beneath the lower flange 231. It will be seen by viewing FIG. 16 that the forward ends 224 of the longitudinal wire member 221 and the upper portions of the teeth 214' snap over the channel-shaped rear member 226 with a friction fit. Each of the teeth 214' are positioned along side a different one of the forward end portions of the longitudinal wire members 221 and when so positioned the teeth 214' and forward ends 224 are clamped between the rear member 226 and the front member 227 by passing bolts 219 through apertures 236 and 237 in the front and rear members respectively and drawing the front member tight against the teeth 214 and front end portion 224 by tightening nuts 229 on the bolts 219. While only one bolt 219 is shown in FIGS. 17 and 18 it will be understood that multiple bolts 219 will be spaced along the crossbar 213 to securely clamp the front member 227 against the rear member. The ground engaging portion 238 of each tooth 214' is inclined rearwardly from the vertical by an angle α (alpha) preferably within the range of between 15° to 20°. However the angle α of rearward inclination is not critical within the range from 0° to 20° but it should not be much greater than 20° for satisfactory performance. If the lower portions 238 of the teeth 214 are made with a zero rearward inclination (i.e. they are initially vertical when applied to the harrow) the teeth have been found to assume a rearward inclination due to the weight of the harrow and resistance to forward motion of the harrow caused by the teeth engaging the ground and other objects as the harrow is pulled in a forward direction. The rearward inclination of the front teeth 214' has been found to facilitate dumping of trash that may accumulate in front of the teeth. It has been found by experimentation that when the teeth 214' are formed with the angle α set at about 15° the dumping action of the teeth to dump trash is quite satisfactory.

FIG. 18 illustrates another tooth form 214'' which is like the tooth 214' except that the loop 241 is omitted. The upper portion 239 of the tooth 214'' includes a channel-shaped bend for snapping over the rear member 226. The transverse extension 242 of the teeth 214' and 214'' gives stability to the teeth against lateral shifting when the teeth are clamped in place as shown in FIGS. 16 and 18 respectively.

Figure 20:
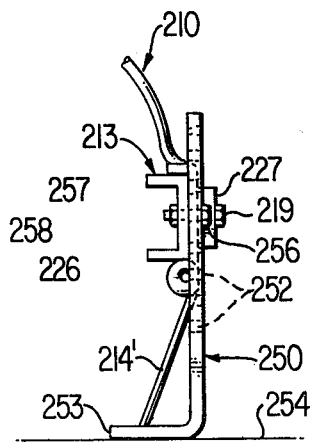
FIG. 20 is a fragmentary left hand side elevational view of the harrow shown in FIG. 19.
Figure 19:
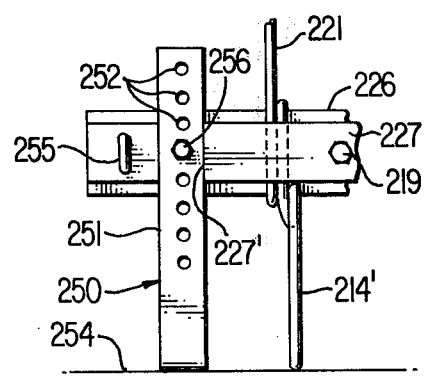
FIG. 19 is a fragmentary front elevational view of the harrow shown in FIG. 16 with an attached skid.

FIGS. 19 and 20 show a skid attachment 250 to the front crossbar 213 of the harrow 210. The skid 250 includes an upright shank 251 having a plurality of vertically spaced holes 252 and a rearward ground engaging extension 253 bent at a right angle to the shank 251 and shown engaging the ground 254. The shank 251 is secured against the rear member 226 of the front crossbar 213 by passing a bolt 256 through a selected one of the holes 252 in the shank 251 and through an aperture 258 in the rear member 226 and tightening the nut 257 on the bolt. The end 227' of front member 227 abuts against the inside edge of the shank 251 and holds the skid upright. While only one skid 250 is shown on one end of the front crossbar 213 it will be understood that a second skid is mounted in similar manner on the opposite end of the crossbar (not shown). The purpose of the skid is to take some or all of the weight of the harrow off of the front teeth 214', and to limit the depth to which the teeth will dig into the ground. When the harrow is being used to scatter manure piles in a pasture the skids will normally be set so that the ends of the front harrow teeth 214' will be approximate the surface of the ground and will not dig into the sod. If the harrow is used for weeding or cultivating a field, the skids are set to allow the harrow teeth to enter the ground to a selected depth. While the skids are shown only on the harrow 210 it will be understood that they can be applied to all of the harrow embodiments disclosed herein. FIG. 19 shows the head of an eye bolt 255 which is secured to the rear member 226 of the front crossbar 213 outside of the skid 250. The eye bolt 255 shown and a similar eye bolt fastened at the other end of the crossbar (not shown) are provided for the attachment of the draft harness 16 (shown in FIG. 1) to the harrow 210.

FIG. 21 shows a channel-shaped rear member 226 of a crossbar 213 as shown in FIGS. 16–18 with two forms of removable front harrow teeth 314 and 414. The front end portions 24 of the longitudinal wire members 21 (forming a wire mesh framework like that shown in FIG. 1) are mounted in the web 232 of the channel-shaped rear member by inserting the offset ends 45 through apertures 36 provided in the web in the same manner as shown in FIG. 3. The teeth 314 each include a ground engaging lower tooth portion 315 (only partially shown) inclined rearwardly from the vertical by about 15 degrees and an upper portion integral with the lower portion comprising a series of bends which serve to hold the tooth to the rear member 226. The bends provide a bottom horizontal portion 316 underlying the bottom flange 231, an upright portion 317 infront of the web 232, a rearward horizontal portion 318 normal to the upright bend 317 and extending through an aperture 35 in the web 232, a second upright portion 319 behind the web 232 and a horizontal laterally extending portion 320 flush against the underside of the upper flange 230 to provide lateral stability for the tooth. The removable tooth 414 includes a lower ground engaging portion 415 inclined rearwardly from the vertical by about 15°, a loop 416 beneath the bottom flange 231, an upright portion in front of the web 232, a rearwardly extending horizontal portion 418 passing through a hole 35 in web 232, a second upright portion 419 behind the web 232 and a horizontal laterally extending portion 420 flush against the underside of the upper flange 230. Although a front clamping bar is not shown in FIG. 21 it will be understood that a front bar 227 will be bolted to the rear member 226 in the same manner as shown in FIG. 16 in order to secure the front end portions 24 of the wire framework and the harrow teeth 314 and 414 in place.

Figure 22:
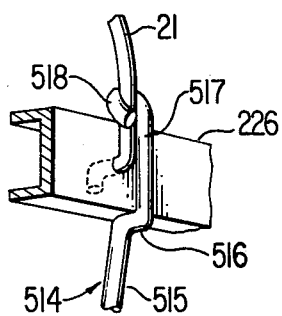
FIG. 22 is a fragmentary perspective view of the front crossbar shown in FIG. 21 with a further modified front harrow tooth.
Figure 23:
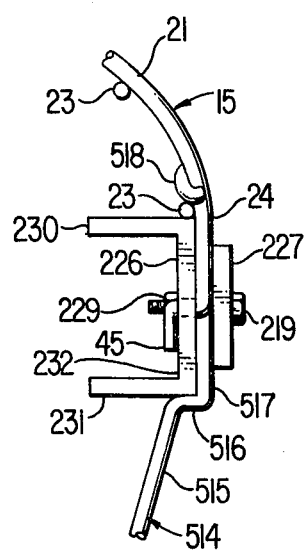
FIG. 23 is a fragmentary side elevational view of the harrow portion shown in FIG. 22 including the front clamping bar.

FIGS. 22 and 23 show still another front harrow tooth embodiment 514 which may be substituted for other front harrow teeth shown in other figures of the drawings. The tooth 514 includes a rearwardly inclined ground engaging portion 515 (only partially shown), a horizontal portion 516 seated beneath the lower flange 231, an upright portion 517 flush against the web 232 and a U-bend 518 which partially encircles the forward end of the longitudinal wire member 21. The U-bend 518 loops behind longitudinal wire member 21 just above the transverse wire member 23 which preferably rests on top of the upper flange of the channel-shaped rear member 226. The tooth 514 is attached by first engaging the U-bend behind the longitudinal wire member 21 and pulling the tooth forward until the U-bend is firmly seated, then rotating the tooth 514 downwardly and rearwardly until the bottom horizontal portion, or knee 516 engages under the bottom flange 231 and the upright portion 517 rests against the channel web 232. With the longitudinal wire members 21 and removable teeth 514 in place at intervals across the channel-shaped rear member 226 (only one shown in FIGS. 22 and 23) the front bar member 227 is clamped in place by means of bolts 219 inserted through the front and rear members 227 and 227 at transversely spaced intervals and fastened by nuts 229.

Figure 15:
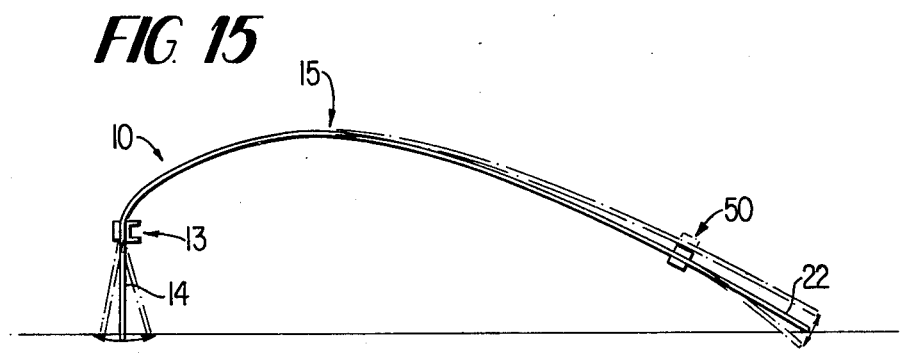
FIG. 15 is a side elevational view of the invention showing in dotted lines the framework and harrow teeth when flexed in normal usage.

FIG. 15 is a diagramatic view of the harrow 10 shown in FIG. 1 illustrating the manner in which the framework 15 flexes as the harrow is pulled across the a field. The solid lines illustrate the normal shape of the harrow and the dotted lines illustrate distorted shapes of the framework 15, front harrow teeth 14 and rear harrow teeth 22 resulting from resilient flexing as the harrow encounters objects in the field, or ground of different degrees of resistance to forward motion of the harrow. The flexing of the framework and teeth 14 and 22 in normal usage will be within the elastic limits of the wire framework and teeth so they will return to their normal shape illustrated by the solid lines when the harrow is stationary.

While in the foregoing there have been described and shown the preferred embodiments of the invention, various modifications and equivalents may be resorted to within the spirit and scope of the invention as claimed.

In the embodiment shown in FIGS. 22 and 23 it is not necessary that the U-bend or open loop 518 be positioned above the transverse wire member 23 since it may also be positioned below the transverse wire member 23 and flush against the upper surface of upper flange 230.

What is claimed is:

1. A lightweight pasture harrow adapted to be pulled over the ground for breaking up piles of manure and the like in a pasture, comprising a rigid elongated front crossbar, a row of transversely spaced front harrow teeth depending from said crossbar, a wire mesh framework secured to said front crossbar along the length thereof and extending rearwardly from said front crossbar, said wire mesh framework including a plurality of transversely spaced longitudinal wire members with trailing ends for engaging the ground and providing a row of transversely spaced rear harrow teeth, and a plurality of longitudinally spaced transverse wire members intersecting said longitudinal wire members with means securing said longitudinal and transverse wire members together where they intersect, said front crossbar including a back member and a front member, and means for clamping said front member to said back member with said front harrow teeth clamped between said front and back members, said front and back members each having a first set of transversely spaced vertical slots for vertically positioning said front harrow teeth, the set of slots in said back member opening forwardly and the set of slots in said front member opening rearwardly in opposed alignment with said first set of slots in said back member to form vertical guides through which said front harrow teeth extend, said back member including a forwardly projecting bottom flange in which said first set of slots in said back member is located, an integral web portion above and rearwardly of said first set of slots, and a first set of transversely spaced holes extending through said web, each of said front harrow teeth having a rearwardly projecting offset portion which extends through one of the holes in said first set of holes.

2. The harrow according to claim 1 wherein said front and back members each have a second set of transversely spaced slots, the second set of slots being offset laterally and intermediate said first set of slots, said longitudinal wire members having forward end portions projecting vertically downward between said front and back members and securely held within said second set of slots.

3. The harrow according to claim 1, wherein said back members includes a forwardly projecting top flange in which said second set of slots of said back member is located, and a second set of transversely spaced holes extending through said web intermediate said first set of holes, each of said downwardly projecting forward ends of said longitudinal wire members having rearwardly projecting offset portions which extend through one of the holes of said second set of holes.

4. A lightweight harrow comprising a plurality of transversely spaced longitudinal wire members, a plurality of longitudinally spaced transverse wire members intersecting said longitudinal wire members, means connecting said longitudinal wire members and said transverse wire members together at their points of intersection, and at least one rigid crossbar means clamped across said longitudinal wire members near one end thereof, said longitudinal wire members being preshaped in like manner to include opposite end portions which normally serve as ground engaging teeth and an intermediate portion which is normally supported above the ground by said opposite end portions, together with at least one replacement tooth for a worn or broken end portion of one of said longitudinal wire members, said replacement tooth being rigidly secured to said one longitudinal wire member adjacent said worn or broken end.

5. The harrow according to claim 4 wherein said longitudinal wire members have an arch shape and said transverse members are straight.

6. A lightweight harrow comprising a plurality of transversely spaced longitudinal wire members, a plurality of longitudinally spaced transverse wire members intersecting said longitudinal wire members, means connecting said longitudinal wire members and said transverse wire members together at their points of intersection, and at least one rigid crossbar means clamped across said longitudinal wire members near one end thereof, said longitudinal wire members being preshaped in like manner to include opposite end portions which normally serve as ground engaging teeth and an intermediate portion which is normally supported above the ground by said opposite end portions, together with at least one replacement tooth for a worn or broken end portion of one of said longitudinal wire members, said replacement tooth being rigidly secured to said one longitudinal wire member adjacent said worn or broken end, said replacement tooth including an elongated portion of approximately the same cross-sectional size and shape and longitudinal configuration as the normal end portion of said one longitudinal member, and a laterally extending U-bend portion, said replacement tooth being positioned with such U-bend portion partially encompassing said one longitudinal wire member and with said elongated portion parallel to said one longitudinal wire member and projecting beyond the worn or broken end to a point substantially in alignment with other teeth at one end of the harrow.

7. The harrow according to claim 6 wherein said crossbar means includes a pair of rigid elongated bar members which are disposed transversely of said longitudinal wire members on opposite sides thereof respectively, and clamping means for drawing said elongated bar members toward each other to clamp said longitudinal wire members securely between them.

8. The harrow according to claim 7 wherein said clamping means includes a U-bolt clamp.

9. A lightweight harrow comprising a plurality of transversely spaced longitudinal wire members, a plurality of longitudinally spaced transverse wire members intersecting said longitudinal wire members at their points of intersection, said longitudinal wire members being preshaped in like manner and each including front and rear end portions and a connecting intermediate portion, all of the front end portions of said longitudinal wire members being aligned and directed toward the ground, and all of the rear end portions being aligned and directed toward the ground, a set of replaceable front teeth, and a set of replaceable rear teeth, each of said replaceable teeth including an elongated tooth portion positioned along side of one of said end portions and projecting beyond said end portion toward the ground, and a laterally extending U-bend portion partially encompassing one of said end portions, and front and rear crossbar means clamped across said front and rear end portions, each crossbar means including a pair of rigid elongated bars and clamping means for drawing said elongated bars together, the pair of elongated bars of said front crossbar means sandwiching said front end portions and said set of replaceable front teeth between them, the pair of elongated bars of said rear crossbar sandwiching said rear end portions and said set of replaceable teeth between them.

10. A lightweight harrow adapted to be pulled over the ground for breaking up piles of manure and the like in a pasture, and for light field cultivation comprising a rigid elongated front crossbar, means for connecting said front crossbar to a tractor or other draft means for towing said harrow, a row of transversely spaced front harrow teeth depending form said crossbar, a wire mesh framework secured to said front crossbar along the length thereof and extending rearwardly from said front crossbar, said wire mesh framework including a plurality of transversely spaced resilient longitudinal wire members with trailing ends for engaging the ground and providing a row of transversely spaced rear harrow teeth, and a plurality of longitudinally spaced transverse wire members intersecting said longitudinal wire members with means securing said longitudinal and transverse wire members together where they intersect, said wire mesh framework normally maintaining a predetermined shape, and being resilient to yeild to encountered objects in normal usage and to return to its predetermined shape upon disengagement with said encountered objects.

11. The harrow according to claim 10 wherein said longitudinal wire members include portions which are vertically arched upwardly and rearwardly from said front crossbar.

12. The harrow according to claim 10 wherein said longitudinal wire members include portions which are straight and slope generally downwardly and rearwardly from above said front crossbar.

13. The harrow according to claim 10 wherein said longitudinal wire members each includes a straight portion extending rearwardly from said front crossbar and a rear end portion angled downwardly from said straight portion.

14. The harrow according to claim 10 together with a rigid reinforcing member secured transversely across said longitudinal wire members along the top of said harrow rear teeth.

15. The harrow according to claim 10 wherein said front harrow teeth are wire teeth each provided with a spring loop intermediate the ends thereof.

16. The harrow according to claim 10 wherein said front crossbar includes a back member and a front member, and means for clamping said front member to said back member with said front harrow teeth clamped between said front and back members.

17. The harrow according to claim 16 wherein said front harrow teeth are integral downward extensions of said longitudinal wire members of said wire mesh framework.

18. The harrow according to claim 16 wherein each of said harrow teeth include a ground engaging portion and an upper portion which is clamped between said front and back members, said upper portion being shaped to partially encompass one of said front and back members with a friction fit.

19. The harrow according to claim 18 wherein said ground engaging portion of each tooth is connected to said upper portion by a spring loop.

20. The harrow according to claim 18 wherein said ground engaging portion is inclined downwardly and rearwardly and makes an angle with said upper portion selected within the range of between 0° and 20°.

21. The harrow according to claim 16 wherein each longitudinal wire member of said wire mesh framework includes a forward end portion which is clamped between said front and back members of said crossbar, said forward end portion being shaped to partially encompass one of said front and back members with a friction fit.

22. The harrow according to claim 16 wherein each of said harrow teeth includes a lower ground engaging portion and an upper portion clamped between said front and back members, and at least some of said longitudinal wire members of said wire mesh framework include forward end portions which are clamped between said front and back members, said upper portion of each tooth and said forward end portions of at least some of said longitudinal wire members being shaped to partially encompass one of said front and back members with a friction fit.

23. The harrow according to claim 10 wherein said front crossbar includes an elongated channel-shaped member having an upper flange, a bottom flange and an intermediate connecting web, and an elongated bar member clamped in spaced parallel relationship to said connecting web of said channel-shaped member, said longitudinal wire members of said wire mesh framework having forward end portions which are clamped between said elongated bar member and said channel-shaped member, said front harrow teeth each including an upwardly extending portion interposed between said elongated bar member and said channel-shaped member and clamped therebetween, and a ground engaging portion.

24. The harrow according to claim 23 wherein said channel-shaped member has a set of transversely spaced holes in said web intermediate said flanges, and each of said forward end portions includes a first downwardly depending portion, an offset downwardly depending portion, and a connecting right angle bend, each of said forward end portions being interlocked with said channel-shaped member with said right angle bend extending through one of the holes of said set of holes and with the offset portion and the first downwardly depending portion extending substantially parallel to said web on opposite sides thereof.

25. The harrow according to claim 24 wherein said, elongated channel-shaped member includes a second set of transversely spaced holes in said web intermediate said flanges, and said upwardly extending portion of each front harrow tooth includes a first upwardly extending section, an offset upwardly extending section, and a substantially right angle bend connecting said first upwardly extending section and said offset upwardly extending section, said right angle bend extending through one of said holes in said second set of holes said first upwardly extending section being clamped between said elongated bar member and said web of said channel-shaped member, and said offset section extending substantially parallel to and against said web on the opposite side thereof from said first upwardly extending section whereby said upwardly extending portion forms an interlock with said channel-shaped member.

26. The harrow according to claim 25 wherein said offset upwardly extending section includes a laterally extending section flush with and parallel to the underside of said upper flange in the longitudinal direction thereof.

27. The harrow according to claim 24 wherein said upwardly extending portion of each harrow tooth includes an open loop portion which engages behind the forward end portion of an adjacent one of said longitudinal wire members above and flush with said upper flange.

28. The harrow according to claim 27 wherein said ground engaging portion of each tooth is connected with said upwardly extending portion by an intermediate bend portion which is flush with and beneath the underside of said bottom flange.

29. The harrow according to claim 23 wherein said ground engaging portion of each harrow tooth extends downwardly and rearwardly from said upwardly extending portion.

30. The harrow according to claim 29 where said ground engaging portion is inclined rearwardly from said upwardly extending portion by an angle selected within the range between 0° and 20°.

31. The harrow according to claim 30 wherein said angle between the ground engaging portion and said upwardly extending portion is between 15° and 20°.

32. The harrow according to claim 23 wherein said ground engaging portion of each harrow tooth is connected to said upwardly extending portion by a spring loop.

33. The harrow according to claim 32 wherein said spring loop is located flush against the under side of said bottom flange.

34. The harrow according to claim 23 wherein said ground engaging portion of each harrow tooth is connected to said upwardly extending portion by an intermediate bend portion which is flush with and parallel to the under side of said bottom flange.

35. The harrow according to claim 10 together with vertically adjustable skid means attached at opposite ends of said front crossbar for supporting said crossbar above the ground and limiting the depth to which said front harrow teeth penetrate the surface of the ground.

36. The harrow according to claim 35 wherein said skid means includes a pair of L-shaped bars, there being one L-shaped bar mounted at each end of said front crossbar, each L-shaped bar including an upstanding shank portion and a rearwardly extending skid portion for engaging the ground, said shank having plural longitudinally spaced holes therein, and fastening means extending through a selected one of said holes in said shank for fastening said shank to said crossbar.

* * * * *